March 30, 1937.  R. P. PESCARA  2,075,133
APPARATUS FOR PRODUCING A COMPRESSED AND HEATED GAS
Filed Aug. 28, 1933   4 Sheets-Sheet 1
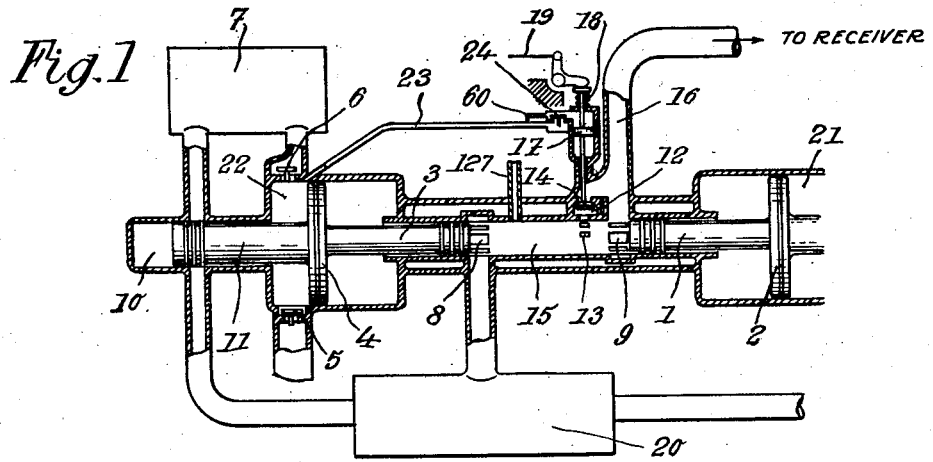
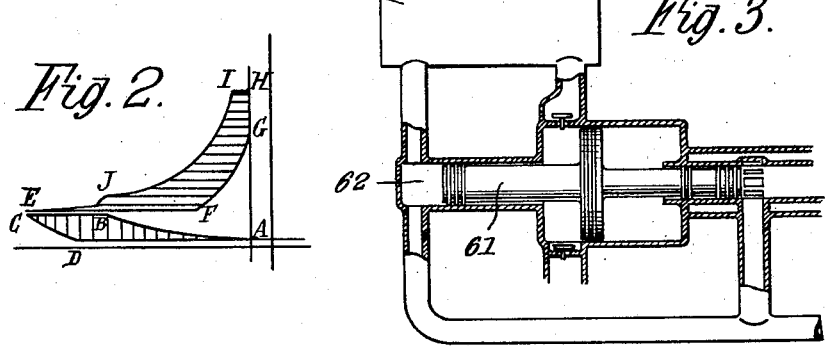
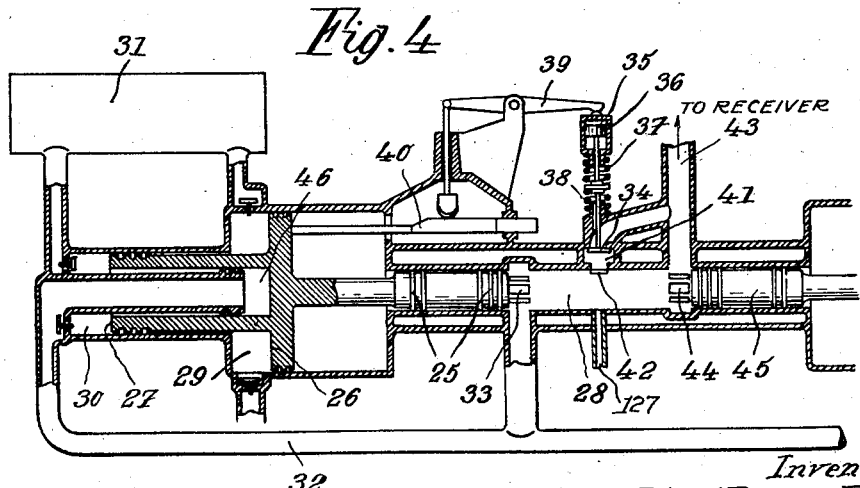
Inventor:
Raul Pateras Pescara
Attorneys:
Bailey & Larson

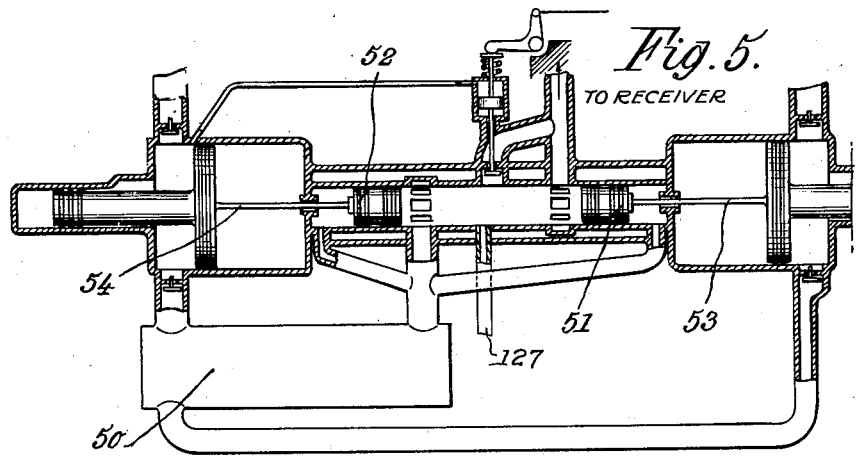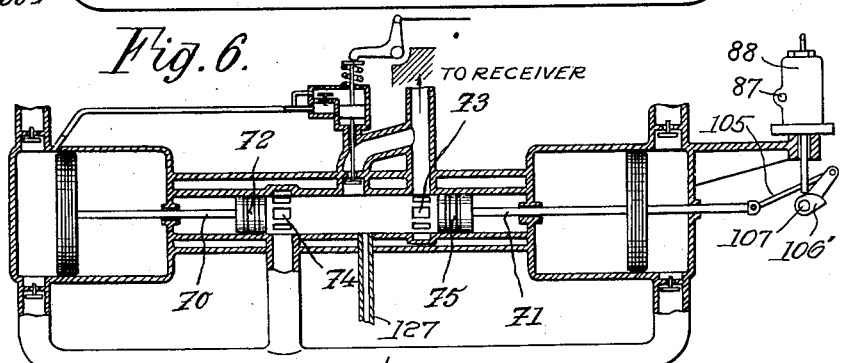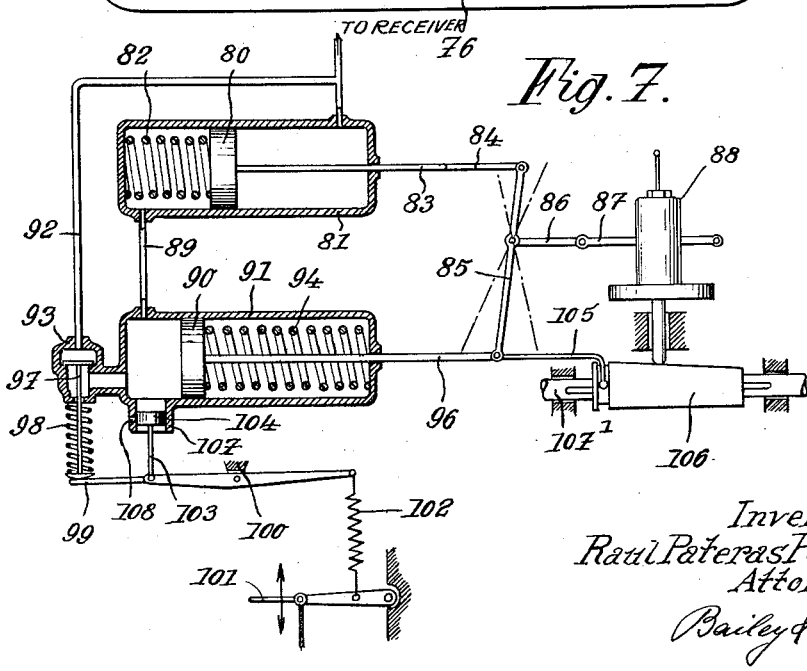

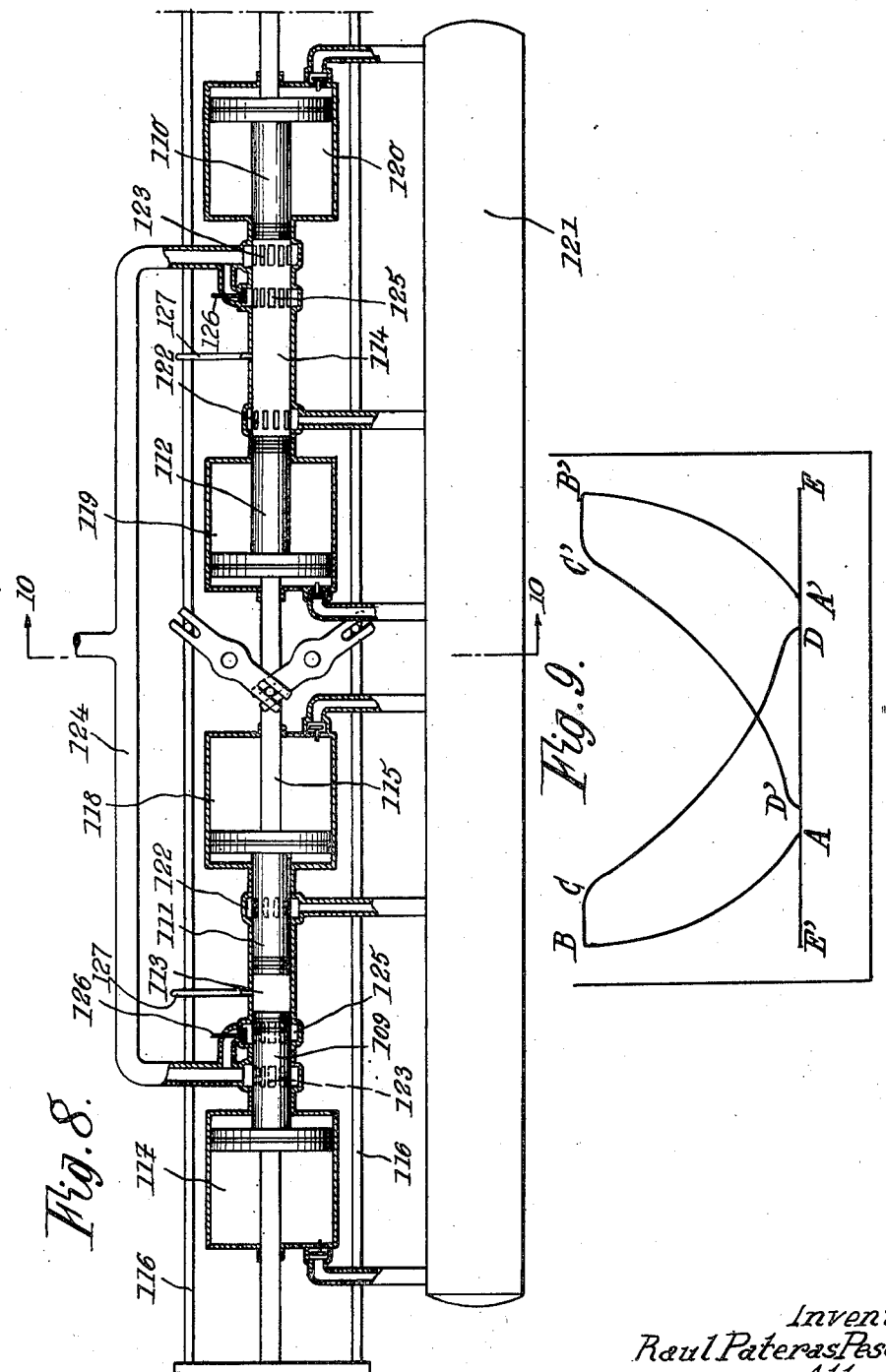

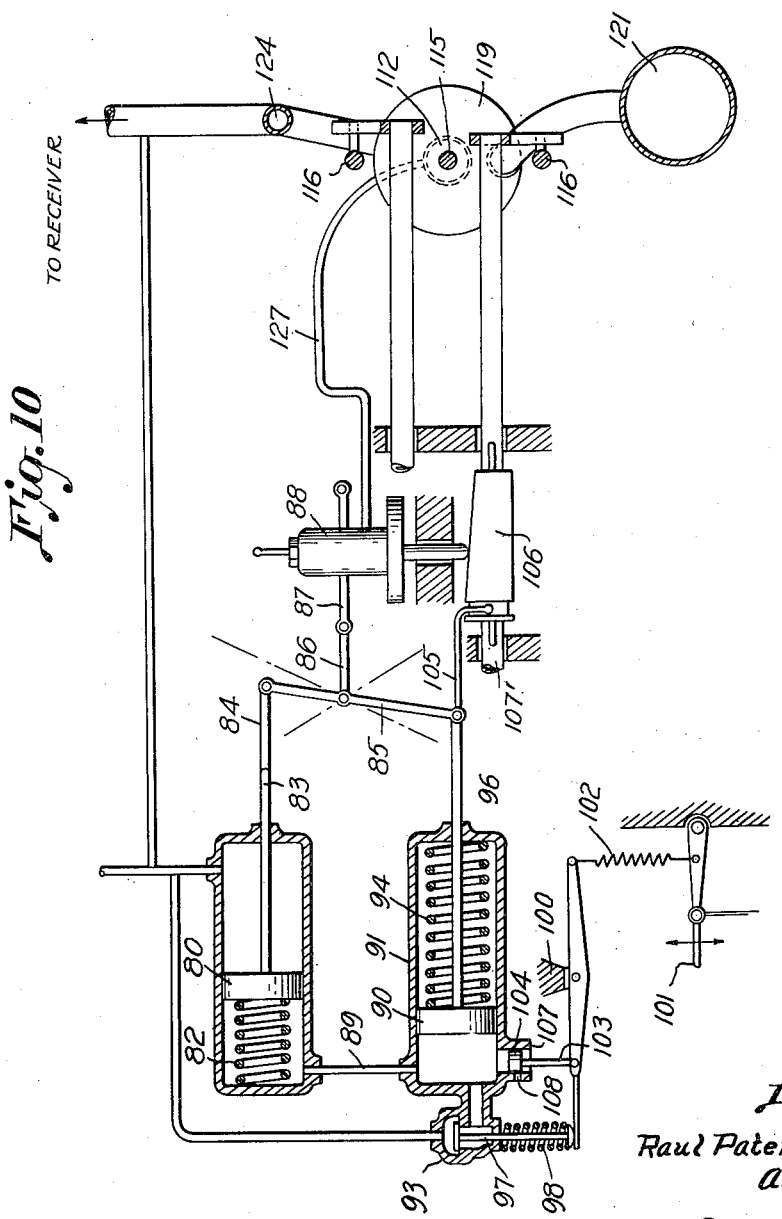

Patented Mar. 30, 1937

2,075,133

UNITED STATES PATENT OFFICE 2,075,133

APPARATUS FOR PRODUCING A COMPRESSED AND HEATED GAS

Raul Pateras Pescara, Paris, France

Application August 28, 1933, Serial No. 687,236
In France August 31, 1932

21 Claims. (Cl. 230—56)

In order to produce a compressed and superheated gas there are several known processes which consist in feeding an engine with air (or an equivalent gas) preliminarily compressed in a suitable compressor. In the particular case in which the auto-compression generator includes a two-cycle internal combustion engine with scavenging means it is possible to feed to the engine, for scavenging purposes, the whole of the compressed gas, only a portion of this gas being utilized for combustion. The excess of the scavenging gas, which merely passes through the engine and then mixes with the exhaust gases, forms with the latter a mixture at a temperature that is not very high, which is given the whole of the heat present in the exhaust gases.

There is also another process, already indicated in my Patent No. 1,629,927, which consists in conveying to the exhaust, during a portion of the compression stroke of the engine, a portion of the gas in question (air) filling the cylinders of the engine, thus causing only a portion of the compressed air introduced into the engine to work in said engine. This method of working permits of obtaining an expansion of the gases down to a pressure very close to the inlet pressure, this condition being very advantageous for a good efficiency and also for lowering the final temperature of the mixture.

The utilization, for auto-compression generators of the type in question, of motor compressors having a fixed stroke and rigid connections between the pistons has certain drawbacks. In particular their output varies according to the operation conditions of the engine.

Now there are motor-compressors in which the pistons are free, which permit of varying the power only by varying the stroke and the output of which therefore varies according to the amount of fuel that is injected for a given discharge pressure.

The chief object of the present invention is to provide motor compressors of that type that are capable of producing a compressed and superheated gas.

To this effect, according to my invention, in order to obtain a compressed and superheated gas, motor compressors of the type above referred to having free pistons, that is to say in which the stroke of the pistons is free to vary, independently of any positive connection, are so arranged that their motor chambers are fed with the whole or a portion of the fluid compressed in the compressing chambers of the motor-compressors.

My invention permits, as it will be hereinafter explained, to produce generators of compressed and superheated fluid capable of operation very smoothly owing to the regulation of the power by variation of the pressure of the gas fed to the motor (that is to say of the pressure of the gases discharged by the compressor) and by variation of the output under constant or uniform conditions of pressure. It further involves other advantages such as the high power of said machines per unit of weight and the facility of starting them.

Another object of my invention is to provide a motor compressor with free pistons of the type above referred to, in which the initial pressure and the mean pressure of the cycle may vary, that have a good stability of operation whatever be the pressure and the output of the gas compressed in the motor and in the compressor.

To this effect I may make use of compensating pneumatic cushions, the pressure of which, either uniform or variable in the course of the cycle, is advantageously a function of the pressure of the air that is discharged, so that the complementary return energy supplied by said cushions is always substantially proportional to the energy necessary for the compression of the motive fluid, the independent cushion being advantageously fed at a pressure equal to the discharge pressure.

Furthermore I may add to the already known compensating cushions, working under either uniform pressure or under variable pressure, a balancing device subjecting the rear faces of the pistons of the motor to the pressure of the feed fluid.

Another object of my invention is to provide a device of the type above referred to in which the rate of discharge of the compressed gas can be varied, whatever be its pressure, by the automatic variation of the stroke of the motor compressor according to the amount of fuel that is injected.

Another object of my invention is to provide a device of the type above referred to in which the power available in the compressed gas can be varied in accordance with the variation of the pressure of the gas that is produced, the variation of said pressure acting both on the amount of fuel that is injected and on the time at which said injection takes place.

Still another object of the device according to my invention is to facilitate the starting of the motor compressor by feeding the motor, for starting, at a pressure close to the external pressure, and by reducing the charge to be compressed by the motor.

According to another feature of my invention there are provided elements for the stability of operation and also a discharge element which is so arranged and controlled as to permit, by reducing the useful compression stroke of the engine, to obtain an expansion of the gases substantially down to the intake pressure, and to permit, when the engine is started, to vary at will the charge to be compressed in the motor.

Another object of my invention is to provide a motor compressor consisting of the combination of at least two elementary motor-compressors as above described the pistons of which are mechanically connected in such manner that the compression stroke of a portion of said pistons corresponds to the non-compression stroke of the other pistons.

In this case I have found that it is advantageous to dispose the inlet ports and the exhaust ports of the motor chambers in such manner that, during the whole of the cycle, the exhaust main remains directly connected with one or the other of said motor chambers as long as the pressure in said chambers is equal to the intake pressure.

Another feature of my invention consists, in the case of a combined motor compressor including a plurality of elementary motor compressors, in providing means for discharging, in a known manner, during a first period of the compression stroke, a greater or less portion of the compressed gas (air) for the combustion of the fuel, and to vary said amount so as to vary the motive power and to also vary, functionally or not, the amount of fuel that is injected and also the time at which said injection takes place.

Preferred embodiments of my invention will be hereinafter described, with reference to the accompanying drawings, given merely by way of example, and in which:

Fig. 1 is a longitudinal sectional view of a motor compressor having two opposed free pistons and adapted to be stabilized by compensating pneumatic cushions working at a variable pressure, as above explained;

Fig. 2 is a diagram illustrating the operation of the device according to Figure 1;

Fig. 3 is a longitudinal sectional view of another embodiment of a motor compressor according to my invention in which the compensating cushions work under uniform pressure;

Fig. 4 shows another embodiment in which the compression takes place in two steps, the discharge valve being mechanically controlled;

Fig. 5 shows another embodiment in which the action of the counter-pressure in the motor is compensated on the rear faces of the motor pistons;

Fig. 6 shows still another embodiment according to which the compensating pneumatic cushions, located behind the motor pistons and limited by them, are connected, during a certain portion of the stroke, with the gas under pressure. During the remainder of the stroke, they work as variable pressure pneumatic cushions;

Fig. 7 is a diagrammatical view of the whole of the regulating members' operation according to the pressure and the rate of discharge;

Fig. 8 is a longitudinal sectional view of a motor compressor consisting of a combination of two elementary motor-compressors, according to my invention;

Fig. 9 is a diagram illustrating the operation conditions of the compressor of Fig. 8.

Fig. 10 is a cross section on the line 10—10 of Fig. 8.

According to the embodiment of Fig. 1, the opposed stepped pistons 1, 2 and 3, 4 act as motor elements by their faces 1 and 3 and as compressing elements by their faces 2 and 4. Suction into compressing chambers 21, 22 takes place through valves such as 5 and discharge into balancing reservoir 7 takes place through valves such as 6. The gases are fed to the engine through ports 8, the exhaust and scavenging gases being evacuated through ports 9. Ports 8 and 9 are successively uncovered by pistons 1 and 3.

Stability of operation is obtained by means of compensating cushions provided in cylindrical chambers such as 10, in which pistons 11 integral with, or rigidly fixed to pistons 1, 2 and 3, 4 fit in a slidable manner.

In a chamber 12, connected through ports 13 with motor cylinder 15, there is provided a valve 14 that permits of connecting the inside of said cylinder 15 with the outlet pipe 16. Said valve is controlled by a piston 17 the upper face of which is connected with compressing chamber 22 through a conduit 23 and a check valve 24. Furthermore, a calibrated orifice 60 affords a direct communication between conduit 23 and the upper face of piston 17. Valve 14 is urged into its closed position by a spring 18. A system of links 19 adapted to be controlled by hand makes it possible to open at will valve 14. The compressed air, before entering the motor, can be cooled in a heat interchanger 20.

In Fig. 2 A—B—C—D is the diagram of the compression and E—F—G—H—I—J is the corresponding motor diagram.

The operation of the device that has just been described is as follows:

According to Figs. 1 and 2, atmospheric air, compressed in compressing chambers 21 and 22, passes through a balancing reservoir and can be cooled when issuing from said reservoir by passing through heat interchanger 20. Said air then penetrates into the motor cylinder through ports 8, uncovered by piston 3 at the end of its outward stroke. The air thus introduced into the motor cylinder serves for the scavenging of the combustion gases, which escape together with it through pipe 16 and exhaust ports 9 which are uncovered by piston 1.

The mixture of the scavenging air and of the exhaust gases is conveyed through exhaust pipe 16 to the energy receiving system.

The supplementary cushions formed by chambers such as 10 restore to pistons such as 11 an energy that is the greater as the stroke of the latter is greater, while the energy supplied by the cushions of the clearance spaces of the cylinders is on the contrary the smaller as the stroke is the greater, since the energy of the last mentioned cushions is inversely proportional to the discharge stroke of the compressors.

When pistons 1 and 3 are brought close to each other, thus closing ports 8 and 9, air is still evacuated through valve 14, until ports 13 are covered. This is due to the fact that the upper face of piston 17 is still subjected to the maximum discharge pressure in chamber 22, owing to the presence of check valve 24, which closes as soon as the pressure drops in chamber 22. Valve 14 is kept open for a time sufficient in order that piston 1 may cover ports 13. After said time the upper face of piston 17 is subjected to a pressure substantially equal to the pressure existing in chamber 22, owing to the presence of calibrated orifice 60, which has served merely to delay the balancing of the pressures.

As long as openings 13 are not covered by piston 1, the fluid expelled by the movements of pistons 1 and 3 toward each other escapes into exhaust pipe 16 (portion E—F of the diagram of Fig. 2) and the compression corresponding to portion F—G of the diagram starts only when ports 13 are covered by the piston. Ports 13 are advantageously disposed on the side of the exhaust ports so that, at the beginning of the compression stroke of the pistons 1 and 3, a gaseous mixture still containing burnt gases may be evacuated through said ports 13.

At the dead point G injection and ignition take place, thus increasing the pressure (F—G) and the expansion of the gases takes place until exhaust ports 9 are opened, since, when piston 1 again uncovers ports 13, the pressure existing in motor cylinder, the action of which is added to that of spring 18, keeps valve 14 closed. Said valve is opened only when the pistons are near the end of their outward stroke, when the pressure in the motor cylinder is equal to the suction pressure.

The compression effected in cylinder 22 can be either polytropic or substantially isothermic. In the latter case the compressed air can be sent such as it is to the motor, or advantageously it may be heated in the intermediate reservoir 7.

According to the embodiment of Fig. 3, the compensating cushion 62, instead of being enclosed in a fluidtight chamber, is kept in constant communication with reservoir 63.

In this case, the compensating complementary energy that serves to ensure the return of the pistons is supplied by the work of the constant pressure in said reservoir acting on pistons such as 61. As this energy is proportional to the displacement of the pistons, it varies with the stroke inversely to the expansion energy of the cushions existing in the clearance spaces of the cylinders and can therefore, by being juxtaposed to the last mentioned energy, ensure the correct return of the pistons whatever be the value of the stroke.

In the embodiment of Fig. 4, the compression of the elastic fluid takes place in two steps by means of stepped pistons such as 25, 26, 27 moving in cylinders such as 28, 29, 30 respectively, cylinder 29 being a chamber of the first compression stage, 30 being a chamber of the second compression stage, and 28 being the motor cylinder.

The air compressed in chamber 29 is stored in a reservoir 31, where it is cooled; said air is again compressed in chamber 30 and delivered to the motor through pipes 32 and ports 33. Valve 34, integral with a piston 35, is indirectly controlled by a cylinder 36 slidable with respect to piston 35, a spring 37 being interposed between a small disk integral with the valve stem and said cylinder 36. Another spring 38, acting in the opposite direction, urges the valve toward its closed position. Cylinder 36 is mechanically controlled by a rocking lever 39 acted upon by a sliding cam 40 rigidly connected to the pistons 25, 26, 27. Valve 34, located in the median part of the cylinder in a chamber 41 connected with cylinder 28 through ports 42 and with the exhaust pipe 43, establishes, when it is open, a direct communication between cylinder 28 and the exhaust pipe 43.

According to this embodiment, the air drawn in from the atmosphere is compressed in the chambers of the first stage of compression, such as 29 cooled in heat interchangers such as 31, again compressed in the chambers of the second stage of compression, such as 30, injected into the motor cylinder through pipes 32 and ports 33 and then evacuated, together with the exhaust gases, through ports 44, into conduit 43 through which the gaseous mixture is conveyed to the receiver.

The method of compressing the air in several stages has the known advantages of requiring a lesser work for the compression of a given amount of air and of lowering the temperature of the cycle.

The operation of the gas in the motor is the following:

Starting from the position in which the pistons are at the ends of their outward strokes, the motor pistons move toward each other; the exhaust ports 44 are closed by piston 45; piston 26 moves cam 40 which causes valve 34 to be closed. Thereupon fuel is injected. The compression of the fluid begins. During the following stroke, valve 34 remains closed until the end of the expansion stroke in spite of the position of cam 40 which has caused rocking lever 39 to push cylinder 36 down and to compress spring 37, the action of which on valve 34 is compensated for by the tension of spring 38. The action of the pressure existing in cylinder 28, to which is added the action of spring 38 on valve 34 is stronger than the air pressure existing between piston 35 and cylinder 36, to which is added the action of spring 37.

It results therefrom that, until the exhaust ports 44 are opened, valve 34 remains closed, thus permitting the expansion of the gases to take place fully.

According to the embodiment of Fig. 5 which is merely a variation of the embodiment of Fig. 1, reservoir 50 is constantly in communication with the rear faces 52 and 51 of the motor pistons, which are connected to the compressing pistons through rods 53 and 54.

In this case, the supplementary pressure acting on the front face of the motor pistons due to the feeding of the engine with a compressed fluid is compensated for by the same supplementary pressure acting on the rear faces of said pistons.

This arrangement permits reduction in the size of the compensating pneumatic cushions and to give them the same size as they would have in the case of a motor compressor having free pistons the motor of which would be fed with air at the normal scavenging pressure.

According to the embodiment shown in Fig. 6 the compensating pneumatic cushions 70 and 71 are located behind the motor pistons 72 and 75. According to their position, said pistons place cushions 70 and 71 into communication with the compressed gas pipe 76 through inlet and outlet ports 73 and 74 respectively. When pistons 72 and 75 have closed the connection with the compressed gas pipe, cushions 70 and 71 work as independent variable pressure cushions.

It will be readily understood that the combination of the constant pressure cushion and of the variable pressure cushion permits, according to the dimensions given to the motor pistons, obtaining a more rigorous compensation for the different discharge pressures.

In all of the apparatus that have been described when the reservoirs are empty, the motor portions of the motor compressors are fed with air at a pressure substantially equal to the atmospheric pressure. The starting of the engine is greatly facilitated by reducing the mean pressure and the charge to be compressed, this being easily obtained by acting on the discharge valve.

According to the arrangement shown in Fig. 7, the piston 80, which fits slidably in a cylinder 81, is subjected on its front face to the pressure of the fluid entering the receiver, and on its rear face to the action of a spring 82, to which is added the action of the pressure transmitted through a conduit 89. The rod 83 of this piston controls, through a small connecting link 86 the rod 87 that controls the volume of feed of the injection pump 88. Another piston 90, movable in a cylinder 91, is subjected on its front face to the action of the gas entering the receiver (said pressure being conveyed through a pipe 92 and a chamber 93) and on its rear face to the action of an opposing spring 94. The rod 96 of this piston controls the lower end of lever 85. In chamber 93 there is disposed a valve 97 subjected to the action of a spring 98. A lever 99, pivoted about a stationary point 100 is controlled through a spring 102 by another lever 101 which is acted upon either by a governor or by the hand of the operator. To this lever 99 is pivoted the rod 103 of a piston 104 adapted to slide in a cylindrical recess 107 of cylinder 91. The orifice of said recess 107 can be opened by moving sufficiently piston 104. The rod of piston 90 further controls, through a fork shaped lever 105, the displacement of the cam 106 (through which the injection pump 88 is controlled) along its ribbed shaft 107¹. The surface of this cam is so devised that, according to its longitudinal displacement, the injection of the fuel takes place sooner or later. Fig. 6 shows at its right side a simplified mechanism for controlling the injection pump 88. In place of the axially movable cam 106 shown in Fig. 7, a rotatable cam 106' is used in this modification.

The operation of the regulation device that has just been described is the following:

When the engine is started, valve 97 being open, piston 90 is in its extreme position toward the left hand side of cylinder 91 and piston 80 is in its normal position. As the pressure increases, piston 90 moves toward the right, increasing the amount of fuel that is injected until the operation pressure imposed by the governor is reached and valve 97 is closed by the action of the pressure acting on piston 104, which in turn acts on lever 99.

If the pressure at the inlet of the receiver further increases, piston 80 moves toward the left, thus reducing the amount of fuel that is injected, until an equilibrium is reached between the power required and the power supplied.

If the pressure at the inlet of the receiver decreases due to an insufficient supply of fluid under pressure, piston 80 moves toward the right hand side thus causing the amount of fuel that is injected to be increased as far as the maximum rate of feed corresponding to the maximum pressure allowed for the apparatus that is being considered.

The working pressure is adjusted either manually through lever 101 acting on spring 102, or by the action of a governor acted upon by the receiver pressure. For increasing the pressure, lever 101 is turned in a counter-clockwise direction so as to increase the tension of spring 102. Valve 97 opens and allows air at a slightly higher pressure to enter cylinder 91. Piston 90 moves toward the right hand side and increases the amount of fuel that is injected. This causes the motive power to be increased and therefore the pressure at the inlet of the receiver to become higher. This new pressure closes valve 97 and new conditions of working are now established.

If lever 101 is moved in a direction corresponding to a decrease of the working pressure, spring 102 is subjected to an upwardly directed action from lever 101, which reduces its tension and piston 104 is pushed in a downward direction, thus uncovering the discharge orifice 108. The pressure on the rear faces of pistons 80 and 90 is reduced and said pistons, by moving toward the left hand side, reduce the amount of fuel fed to the engine.

The displacements of cam 106 corresponding to the displacements of piston 90 are such that the injection of fuel takes place earlier when the operation pressure increases. In this case, ignition always takes place under satisfactory conditions, owing to the increase of the pressure in the motor, and combustion takes place at a more constant pressure, without the maximum pressure being very much varied.

In the different embodiments that have been above described, the rate of discharge of compressed air is regulated under constant pressure by varying the amount of fuel that is injected, the variation of motive energy automatically varying the curve of the cycle and therefore varying the rate of discharge of the compressed fluid.

Of course the special devices for controlling the discharge valve can be applied to any of the apparatus above described, and also to the specific device for compensating the pressure on the front and rear faces of the motor pistons, according to Fig. 5.

The same is true of the various stabilizing systems and of the multiple stage compression system, which may be applied to any of the cases shown in the appended drawings.

In the preceding description I have referred only to simple or elementary motor-compressors. Now such motor compressors discharge compressed air only during a portion of their motive stroke.

By combining motor-compressors, for instance according to the so-called tandem arrangement, one of the elementary motor compressors is always discharging compressed air so that the flow of compressed air is more uniform. However, for practical purposes, the time for which each motor compressor is discharging air is never equal to 50% of the duration of the cycle. In some applications of compressed air it is very important that the flow of compressed air at the inlet of the receiver should be as regular as possible, especially when the receiver is a turbine. The intermediate reservoirs that are generally used for this purpose, that is to say to render the flow as uniform as possible, must be of very great volume. The fact of connecting several generators with the same reservoir does not make it possible to reduce the volume thereof, due to the lack of synchronization between the independent generators, which could not be relied upon to work with a rigorously constant lag with respect to one another. The present invention makes it possible, by suitably utilizing and arranging motor generators for producing a compressed fluid, advantageously connected together in tandem fashion, to obtain the following results:

The outflow of compressed fluid is continuous and smooth, so that said fluid can be utilized directly in the receivers;

The specific power of the apparatus is substantially increased;

Their efficiency is also increased.

In the embodiment shown in Fig. 8, two groups of staged pistons, such as 109—110 and 111—112, respectively connected together through rigid rods 115 and 116, move in motor cylinders 113 and 114 and in compressing cylinders 117—118—119—120, the group 109—110 moving in a direction opposite to that of the group 111—112. The air compressed in cylinders 117—118—119—120 can be discharged into a reservoir such as 121 from which it passes into motor cylinders 113—114, for instance through ports such as 122. The gases escape from the motor cylinders for instance through ports such as 123 leading to a main 124. During the first part of the non-motive stroke, the opening of valves such as 126 permits a certain amount of compressed air to be evacuated, for instance into a conduit 124, through ports such as 125.

As shown in Fig. 10, the mechanism of Fig. 7 may be used to control the feed of fuel to the motor cylinders through feed lines 127.

The curve of Fig. 9 shows that if the ports such as 122—123 and 125 are made of suitable dimensions it is possible to obtain in the outlet pipe 124 a uniform pressure. In said curve AB and A'B' correspond to the compression strokes in the motor cylinders 114 and 113; CD and C'D' correspond to the expansion strokes, the expansion being prolonged until the pressure is equal to the intake pressure; DE and D'E' correspond to the exhaust.

The requirement of obtaining a prolonged expansion, without exceeding a certain pressure corresponding to a temperature at the end of the expansion corresponding to a good operation of the members of the receiver makes it necessary to start the compression in the motor later than in a cycle corresponding to the feeding of the engine at ordinary pressure, by discharging into the outlet pipe an amount of gas already introduced into the motor cylinders and at a pressure equal to the intake pressure (portion DA of the curve).

A constant pressure will be maintained in the outlet pipe if, when the compression starts in one of the motors (A) due to the closing of ports 125 or of valve 126, the exhaust is starting in the second motor cylinder or even has already begun. Owing to the symmetry of the two motors, the pressure will be maintained uniform in the outlet pipe as far as point A'; the exhaust of the first motor being then open since point D, the pressure in the outlet pipe will thus be maintained uniform for the whole of the cycle.

According to the conditions that have been above stated, the temperature of the gaseous mixture entering the receiver is limited by the necessity of ensuring a proper working of the elements of said receiver.

For a short period of time it is generally possible to utilize a temperature higher than the normal temperature of operation, which, for reasons of safety, is always chosen much lower than the dangerous temperature.

By making use of a mixture at a higher temperature one might substantially increase the power of the generator, by evacuating a lesser amount of air during the first part of the compression stroke of the motor. As the amount of gas serving to the combustion that works in the motor is greater, it is also possible to increase the amount of fuel and therefore the power of the receiver. The adjusting control 19 of valve 18 permits, to this effect, to limit at will the amount of air that is evacuated during the first part of the compression stroke of the motor.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

Concerning the conditions that I consider advantageous for practical purposes, I may state that good operation is obtained when the discharge pressure is 4 kilogrammes per square centimeter, the temperature of the gases discharged being 400° C.

What I claim is:

1. A motor compressor unit of the type described, comprising, in combination, a motor cylinder, two compression cylinders disposed on opposite sides of said motor cylinder and in line therewith, two pistons adapted each to slide at one end in said motor cylinder and at the other end in one of said compression cylinders, means for returning the pistons to their initial positions after the expansion stroke, means for conducting at least a part of the air from said compression cylinders to said motor cylinder, means to discharge from the motor cylinder the hot, compressed gas at increased pressure, and a compressed gas conduit connected to said discharge means, said unit operating at variable pressures.

2. A motor compressor unit of the type described, comprising, in combination, a motor cylinder, two compression cylinders disposed on opposite sides of said motor cylinder and in line therewith, two pistons adapted each to slide at one end in said motor cylinder and at the other end in one of said compression cylinders, means for returning the pistons to their initial positions after the expansion stroke, means for conducting at least a part of the air from said compression cylinders to said motor cylinder, means to discharge from the motor cylinder the hot, compressed gas at increased pressure, and a compressed gas conduit connected to said discharge means, said unit operating at variable pressures, said returning means comprising supplementary cylinders rigidly connected to the first mentioned cylinders and in communication at least at times with the compression cylinders, and supplementary pistons carried by the first mentioned pistons and fitting slidably in said supplementary cylinders so as to form therein a compensating pneumatic cushion that returns the pistons towards each other.

3. A motor compressor of the type described, comprising, in combination, a motor cylinder, two groups of two compression cylinders, one group at each end of said motor cylinder and in line therewith, two pistons each adapted to slide freely at one end in said motor cylinder, the other end being so shaped as to form two piston elements adapted to slide freely in the two corresponding compression cylinders respectively, means for causing the fluid compressed in one of said two compression cylinders to pass into the second of said compression cylinders, whereby compression takes place in two stages, means for returning the pistons to their initial positions after the expansion stroke, means for conducting at least a part of the air from said compression cylinders to said motor cylinder, means to discharge from the motor cylinder the hot, compressed gas at increased pressure, and a compressed gas conduit connected to said discharge means, said unit operating at variable pressures.

4. A motor compressor according to claim 2 in which the supplementary cylinders are entirely closed when the supplementary pistons have moved a predetermined distance therein.

5. A motor compressor according to claim 2 further comprising a reservoir connected with the compression cylinders so as to receive the compressed fluid therefrom, the supplementary cylinders being constantly connected with said reservoir.

6. A motor compressor according to claim 1 further comprising a reservoir connected with the compression cylinders so as to receive the compressed fluid therefrom, in which motor compressor each of the pistons comprises a compressing piston adapted to reciprocate in the compression cylinder, a motor piston adapted to reciprocate in the motor cylinder, and rigid means for connecting together said piston elements, the device further comprising means for connecting the outer ends of said motor pistons with the inside of said reservoir.

7. A motor compressor of the type described, comprising in combination, a motor cylinder, two compression cylinders disposed on opposite sides of said motor cylinder and in line therewith, two pistons adapted each to slide freely at one end in said motor cylinder and at the other end in one of said compression cylinders, compensating means for bringing back the pistons toward each other, a reservoir connected with the compression cylinders so as to receive the compressed fluid therefrom, a plurality of ports in said motor cylinder connected to said reservoir and adapted to be alternately covered and uncovered by the corresponding ends of the pistons, means to discharge from the motor cylinder the hot, compressed gas at increased pressures, a compressed gas conduit connected to said discharge means, and means, sensitive both to the pressure in said motor cylinder and to the pressure in said compression cylinders for allowing the gases under pressure introduced into said motor cylinder to escape therefrom during the beginning of the compression stroke.

8. A motor compressor according to claim 3 further comprising an outlet pipe for the gases in the motor cylinder, and means operatively connected with one of said pistons and responsive to variations of pressure in said motor cylinder for connecting the inside of said motor cylinder with said outlet pipe during a portion of the movement of the pistons toward each other in the motor cylinder.

9. A motor compressor according to claim 2 further comprising a main connected with the compression cylinders so as to receive the compressed fluid therefrom, in which motor cylinder each of the pistons comprises a compressing piston adapted to reciprocate in the compression cylinder, a motor piston adapted to reciprocate in the motor cylinder and rigid means for connecting together said piston elements, the device further comprising means for connecting the outer ends of said motor pistons with the inside of said main for a portion only of the stroke of the pistons.

10. A motor compressor according to claim 1 further comprising adjustable feeding means for injecting fuel into the motor cylinder, and means, responsive to variations of the rate of discharge of the gases from said motor cylinder, for modifying the rate of feed of said adjustable means.

11. A motor compressor according to claim 1 further comprising an outlet pipe for the outflow of the gases from said motor cylinder, adjustable feed means for injecting fuel into the motor cylinder, and means responsive to variations of pressure in the outlet pipe for modifying both the rate of feed of said adjustable means and the time at which injection of the fuel takes place.

12. A motor compressor according to claim 1 further comprising an outlet pipe for the outflow of the gases from said motor cylinder, adjustable feed means for injecting fuel into the motor cylinder, and means, responsive both to variations of the rate of flow of the gases through the outlet pipe and to variations of pressure in said outlet pipe, for modifying both the rate of feed of said adjustable feed means and the time at which injection of the fuel takes place.

13. A motor compressor according to claim 1, further comprising an outlet pipe for the overflow of the gases from said motor cylinder, adjustable feed means for injecting fuel into the motor cylinder, and means for reducing the rate of feed of said adjustable means when the motor compressor is started and gradually increasing said rate of feed as the rate of flow of the compressed gases through the outlet pipe increases.

14. A motor compressor comprising a plurality of elementary motor compressors according to claim 1 and means for rigidly connecting together the respective pistons of said elementary motor compressors.

15. A motor compressor comprising two elementary motor compressors according to claim 1 and means for rigidly connecting together the respective pistons of said two elementary motor compressors in such manner as to form a tandem combined structure.

16. A motor compressor comprising two elementary motor compressors according to claim 1 and rigid rods for connecting together the respective pistons of said two elementary motor compressors in such manner that the inward stroke of the pistons of one elementary motor compressor corresponds positively to the outward stroke of the pistons of the other elementary motor compressor.

17. A motor compressor comprising two elementary motor compressors according to claim 1 and rigid means for connecting together the respective pistons of said two elementary motor compressors in such manner that the inward stroke of the pistons of one elementary motor compressor corresponds positively to the outward stroke of the pistons of the other elementary motor compressor, a main connected to the compression cylinders of both elementary motor compressors, another main for the outflow of the gases from said motor cylinders, both motor cylinders being provided with ports adapted to be alternately covered and uncovered by the pistons therein and connected with the said mains respectively, said ports being so positioned that one of them is always uncovered, whereby said second main is always connected with at least one motor cylinder.

18. A motor compressor unit according to claim 1 further comprising adjustable feeding means for injecting fuel into the motor cylinder, and means, responsive to variations of pressure of the gases from said motor cylinder for modifying the rate of feed of said adjustable means.

19. A motor compressor unit according to claim 1 further comprising adjustable feed means for injecting fuel into the motor cylinder, and means, responsive to variations of at least one working condition of said unit, for modifying the time at which injection of the fuel takes place.

20. A motor compressor unit according to claim 1 further comprising adjustable feed means for injecting fuel into the motor cylinder, and means, responsive to variations of pressure of the gases from said motor cylinder, for modifying the time at which injection of the fuel takes place.

21. A motor compressor unit according to claim 1 further comprising adjustable feeding means for injecting fuel into the motor cylinder, and means, responsive to variations of pressure of the gases from said motor cylinder for regulating the rate of feed of said adjustable means within certain limits, said limits being adjustable dependently on the working pressure of said gases so that said limits are higher at higher pressures than at lower pressures.

RAUL PATERAS PESCARA.